United States Patent [19]

Duff et al.

[11] 4,336,631
[45] Jun. 29, 1982

[54] HANDLE ASSEMBLY, TOP-LOAD CARTRIDGE

[75] Inventors: James A. Duff, Omaha, Nebr.; Donald R. Boisvert, Minneapolis, Minn.

[73] Assignee: Magnetic Peripherals, Inc., Minneapolis, Minn.

[21] Appl. No.: 138,252

[22] Filed: May 12, 1980

[51] Int. Cl.³ ............................................. G11B 23/02
[52] U.S. Cl. .................................... 16/126; 206/444
[58] Field of Search ............... 206/444, 403, 405, 404, 206/406; 16/126

[56] References Cited

U.S. PATENT DOCUMENTS

| | | |
|---|---|---|
| 3,465,875 | 9/1969 | McKelvey, Jr. |
| 3,635,608 | 1/1972 | Crouch ................................ 206/444 |
| 3,715,739 | 2/1973 | Van Acker. |
| 3,882,701 | 5/1975 | Wirth ............................. 206/444 X |
| 3,917,068 | 11/1975 | Cheney ............................. 206/444 |
| 4,071,862 | 1/1978 | Lathrop et al. ................. 206/444 X |
| 4,090,609 | 5/1978 | Rager ................................ 206/444 |
| 4,235,339 | 11/1980 | Christensen et al. ............. 206/444 |
| 4,253,129 | 2/1981 | Butz et al. ..................... 206/444 X |

*Primary Examiner*—Andrew V. Kundrat
*Attorney, Agent, or Firm*—Edward L. Schwarz; Joseph A. Genovese

[57] ABSTRACT

A disc memory cartridge double-acting handle design increases, over an earlier design, the amount of material resisting stresses at critical points to increase overall stiffness and strength. The increased stiffness and strength allows plastic to be used as the structural material for the mechanism, rather than the metal of the earlier design. The manipulation required is unchanged from the earlier design.

3 Claims, 4 Drawing Figures

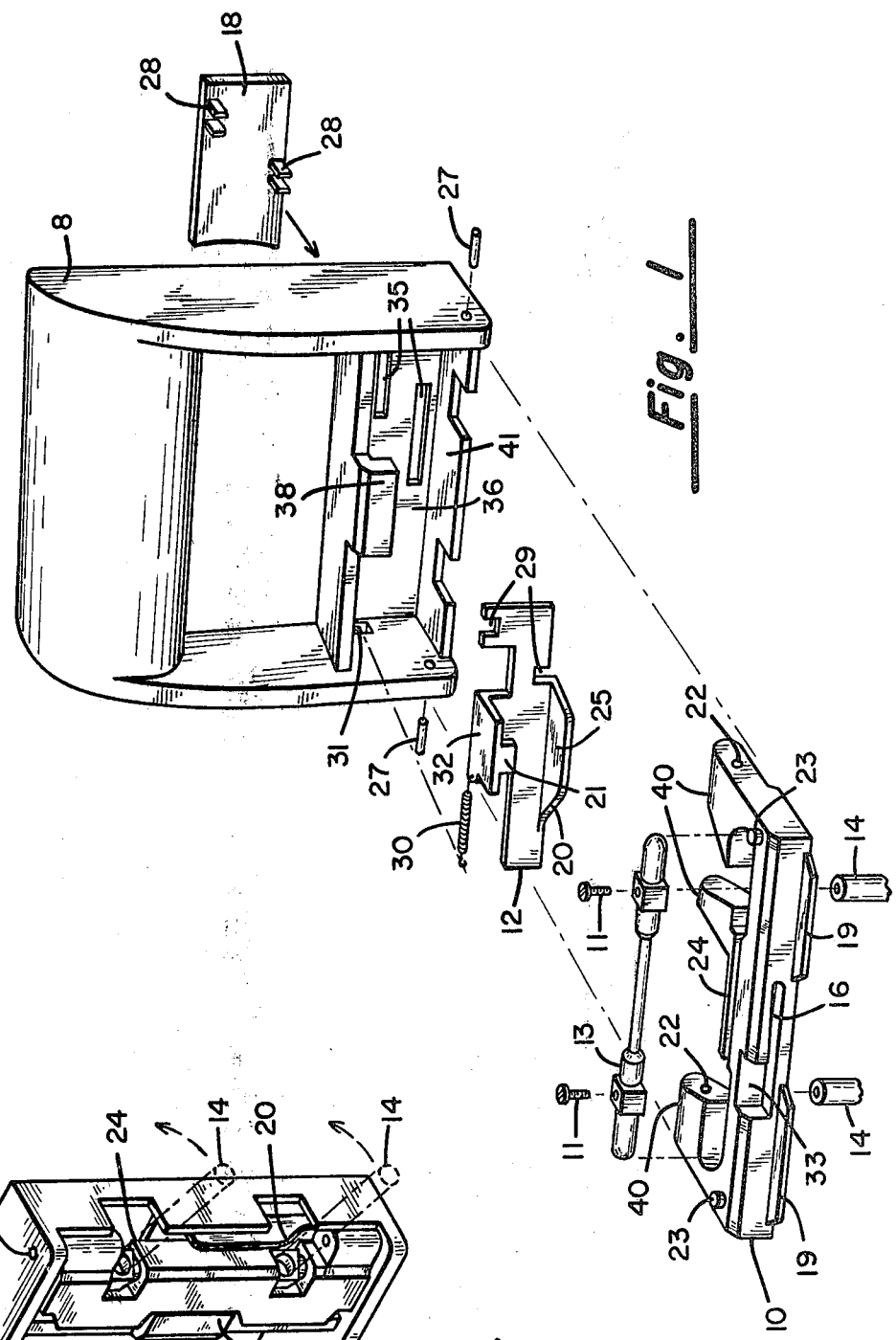
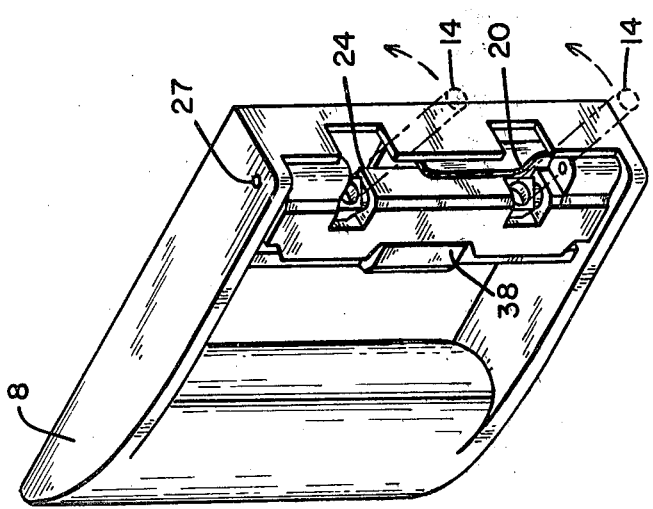

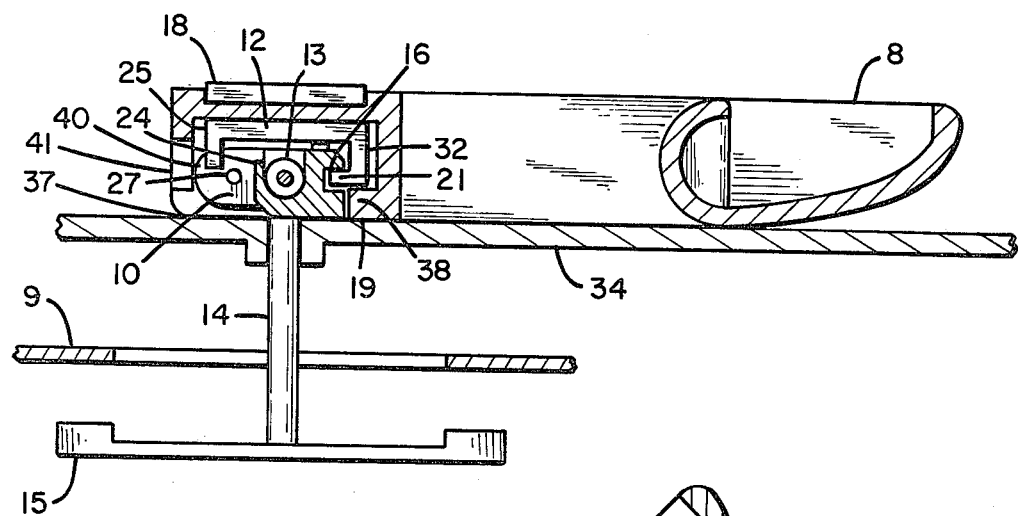
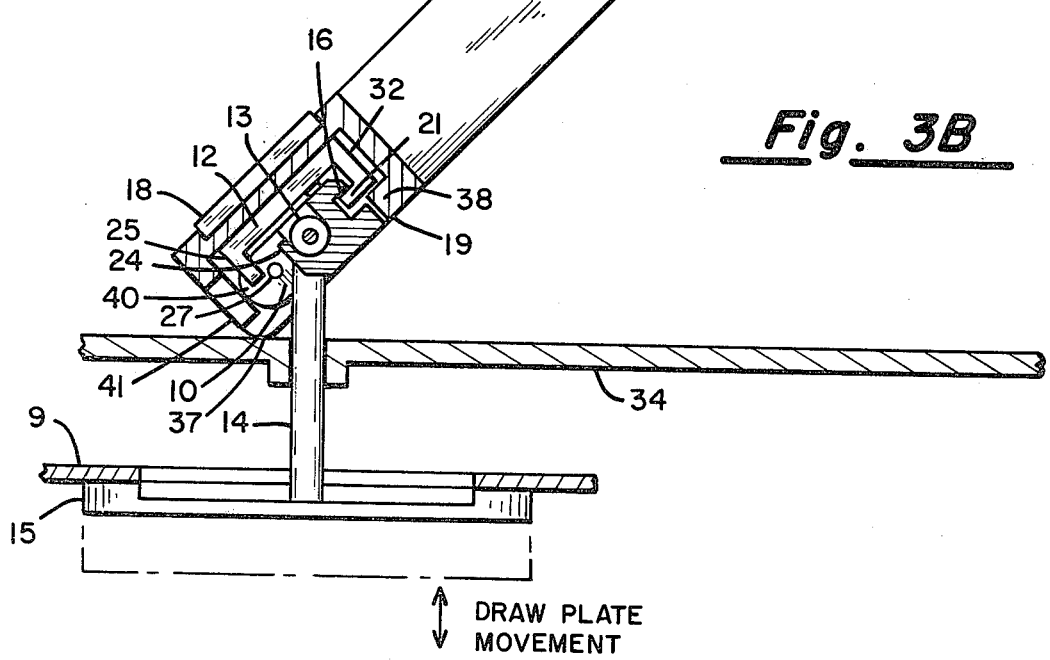

HANDLE ASSEMBLY, TOP-LOAD CARTRIDGE

BACKGROUND

In the magnetic data recording arts, the disc-shaped medium is now perhaps the most prominent. Many of these are made to be detachable from the drive mechanism. Because of the necessity to keep them free of contamination, the rigid type of detachable disc cartridge is now invariably totally enclosed in a housing when not mounted on a drive. To provide access to the disc surfaces for the magnetic data transducers, the housings for detachable discs again typically have a detachable dust shield or cover which closes, while this cartridge is unmounted on a drive, the ports through which the disc and its spindle are accessed during operation. One particular type of cover is magnetically attached to a ferrous portion of the hub assembly which carries the discs and which is magnetically attached to the spindle of the drive for rotation of the discs. Magnets set near the center of the cover clamp it to the hub and securely press its periphery against a mating surface on the housing to exclude contamination. The drive spindle is similarly attached with magnets to the hub when the cartridge is mounted in a drive.

In these designs, it is typical to employ a so-called double-acting handle which in the first place may be used to carry the cartridge by simply lifting it. If a slide on the handle is manually actuated before the handle is lifted, an internal mechanism operates to break the magnetic attraction between the hub and the cover or the spindle greatly simplifying detaching the hub from either. Such double-acting handles have been available for several years. They are typically now manufactured with an internal metal mechanism to provide the selectable functions and necessary leverage for detaching the cover. Although metal is perfectly satisfactory from a functional standpoint, the use of plastic for this double-acting mechanism is attractive because costs can be substantially lowered through its use. Because of the lesser strength and stiffness of plastic however, it is not possible to directly duplicate the design of the metal mechanism now in use, in plastic. Accordingly, it is necessary to change the internal double-acting mechanism of the handle when it is made from plastic. U.S. Pat. No. 3,635,608 discloses the internal mechanism of the prior art handle as embodied in metal. The solution we disclose below is the same in both function and operation but employs different internal design to permit the internal mechanism to be made from plastic.

BRIEF DESCRIPTION OF THE INVENTION

In our design, the catch 32 and projection 33, shown in FIG. 5 of the '608 patent, are replaced with a slot and wide projection arrangement which distributes the load over a greater area. A cam arrangement forces the manual slide into actuated position if only partially actuated when the handle is lifted.

Accordingly, one purpose of this invention is to permit the use of plastic in the double-acting mechanism of disc memory cartridge handles. This is accomplished by reducing bending moments on elements acting as beams in the mechanism, increasing cross-sectional moments of inertia of these beams, and distributing loads uniformly across these elements.

Another purpose is to reduce the cost of such handles by reducing component count and cost.

BRIEF DESCRIPTION OF THE DRAWINGS

FIG. 1 is an exploded view of the handle of this invention.

FIG. 2 is a perspective drawing of the handle partially raised after the slide thereon has been manually actuated.

FIG. 3A is a side section of the handle in its flat position.

FIG. 3B is a side section of the handle with the slide actuated and the handle partially rotated to its raised position.

DESCRIPTION OF THE PREFERRED EMBODIMENT

In FIG. 1, the handle is shown in its upright or raised position and the internal draw plate lifting and latch mechanisms exploded with their parts positioned as though slide 18 has not been manually actuated. When assembled, manually actuatable slide 18 is located externally on the surface of handle frame 8 facing away from and toward the right of the viewer as shown in FIG. 1. Prongs 28 pass through slots 35 and latch into slots 29 on carrier 12. Carrier 12 in turn fits within cavity 36 and is held in place by the latching of prongs 28. Spring 30, attached between hook 31 integral with frame 8 at the side of the cavity 36 and carrier 12, provides spring loading to urge carrier 12 and slide 18 to the left where a boss contacts the left hand end of a third slot in which it slides (boss and slot not shown) to limit further movement to the left. Handle frame 8 is pivotally attached by pins 27 to bracket 10 at holes 22, allowing frame 8 to freely rotate with respect to bracket 10 from flat against housing 34 as shown in FIG. 3A to raised as in FIG. 1, when the latch mechanism isn't actuated. Shaft 13 snap fits within the elongated cavity in bracket 10 and adjacent projection 24, and is held in place by constant spring tension on connecting rods 14. Connecting rods 14, attached by machine screws 11 to shaft 13, are attached to a draw plate 15 (FIG. 3A or 3B) of the type described in U.S. Pat. No. 3,635,608. Projections 19 additionally stiffen bracket 10. Feet 23 are intended to maintain clearance from frame 8 when bracket 10 is folded into frame 8 by rotation on pins 27.

As frame 8 of an assembled handle is rotated downward and to the left on pins 27 from the raised position shown in FIG. 1 to the flat position of FIG. 3A, cavity 36 encloses bracket 10. During this movement, projection 21 on carrier 12 is moved relatively into entry port or gap 33 on bracket 10, port 33 being wider than projection 21. When bracket 10 is completely enclosed by cavity 36, projection 21 is aligned with the entrance to slot 16. The length of slot 16 should be at least as great as the width of projection 21. The width of slot 16 must be greater than the thickness of projection 21 to allow projection 21 to enter slot 16. The relative position of carrier 12 and bracket 10 is such that projection 21 is very close to the bottom of entry port 33 and slot 16 when frame 8 has been rotated down onto the top surface of the disc housing to enclose bracket 10 in cavity 36. That is, projection 21 should extend almost completely into entry port 33.

When slide 18 is actuated by manually shifting it to the right so as to cause carrier 12 to extend the spring while handle frame 8 is flat against the top surface 37 of the disc housing 34 (FIG. 3A), projection 21 passes into slot 16. As handle frame 8 is rotated toward its raised position (shown partially raised in FIG. 3B) from its flat position, with slide 18 actuated, projection 21 engages the top edge (as shown in FIG. 1) of slot 16. When slide 18 is so actuated, rotation of handle frame 8 from its flat through its partially raised position in FIG. 3B to its completely raised position vertical to surface 37 causes the lower left corner of frame 8 to become a fulcrum against surface 37 causing connecting rods 14 and draw plate 15 to be shifted closer to surface 37. This movement produces the desired lifting force on the top plate 9 of the disc hub to break the magnetic attractive force between the bottom of the disc hub and the cover or the drive spindle. The side of slot 16 which engages projection 21 is sloped so that slot 16 widens progressively from its entrance. The engaging surface of projection 21 is substantially parallel to this sloping side of slot 16. A suitable value of slope for these surfaces is 4°. This prevents the force of spring 30 from shifting carrier 12 to the left and releasing bracket 10 while frame 8 is being lifted. Projection 38 furnishes additional support for projection 21 and help oppose the considerable force generated on projection 21 by the relatively large mechanical advantage of handle frame 8 and the strong magnetic cover and spindle. The inside surface of projection 24 conforms to the circular cross-section of shaft 13 adjacent connecting rods 14 to rigidly support shaft 13 in these areas. It is important that bracket 10 be very stiff to prevent excessive deflection when breaking the magnetic attraction. Thus lobes 40 are designed to be pressed on wall 41 of cavity 36 when draw plate 15 is being lifted to provide additional stiffness.

A problem of this design is the potential for a portion of either projection 21 or slot 16 with which projection 21 latches, to shear off if projection 21 is shifted only part way into slot 16. To solve this problem, flange 25 on carrier 12 has a cam surface 20 lying near the left hand (FIG. 1) one of the connecting rods 14 when handle frame 8 is in its flat position. If any part of projection 21 engages with slot 16, bracket 10 will still be locked, although insecurely, with carrier 12, and handle frame 8 rotates with respect to shaft 13, an axis spaced apart from cam surface 20. This causes the left connecting rod 14 in FIG. 1 to contact cam surface 20 and force carrier 12 toward its properly actuated position, as shown in FIG. 2. Thus potential chipping and breakage of projection 21 and the wall of slot 16 can be substantially reduced. In addition, cam 20, as frame 8 nears its upright position with bracket 10 locked, positively prevents displacement of projection 21 with slot 16, a possibility since the pressure between them will decrease as the angle of rods 14 becomes more acute and the magnetic attraction is broken.

We claim:

1. In a double-acting disc memory module handle of the type pivotally attached to a bracket, said bracket pivotally attached in turn to connecting rods attached to a draw plate within the disc hub, said handle and bracket including a latch mechanism locking, by manual actuation of a spring loaded slide, the handle and bracket together when the handle and bracket are lying flat against the module top surface, and drawing the draw plate toward the module top by leverage exerted on the connecting rods while the handle and bracket are locked together and manually rotated to a raised position relative to the module top with the module top forming a fulcrum support, said handle further independently rotatable to the raised position without affecting the position of the bracket when the handle and bracket are not locked together, the improvement comprising a locking mechanism including (a) an area of the bracket spaced farther from the handle to bracket pivot axis than from the bracket to connecting rod pivot axis, said area incorporating a slot parallel to the pivot axis between the bracket and the connecting rods, an entry port in the slot at a first end thereof extending away from the module top, the width of the entry port being greater than a predetermined width dimension; and (b) a carrier comprising the latch mechanism shiftable parallel to the connecting rod to bracket pivot axis and carried by the handle, and having a projection extending transverse to the pivot axes and lying in the entry port, and aligned with the entrance to the slot when the bracket and the handle are lying flat against the module top, said projection having the predetermined width dimension and being less thick than the slot's width, wherein manual actuation of the latch mechanism shifts the carrier-supported projection into the slot between its second end and the entry port, and manually rotating the handle toward its raised position while the latch mechanism is actuated causes the projection to engage the side of the slot thereby causing the bracket and handle to rotate as a unit, and wherein the projection moves relatively through the entry port as the handle is rotated between its flat and raised positions with the latch mechanism not actuated.

2. The handle of claim 1, wherein the bracket further comprises a rotating shaft to which the connecting rods are fixed and having a circular cross section adjacent the connecting rods, said bracket having a projection at least partly surrounding and supporting the shaft to whose circular cross-section its inner surface conforms, and extending between the connecting rods.

3. The handle of claim 1, wherein the slide further comprises a second projection carrying a cam surface adjacent a connecting rod, said second projection, when the handle is in its flat position, spaced further from the bracket to handle pivot axis than from the bracket to connecting rod pivot axis and approximately aligned with these two axes, said cam surface further located to engage the adjacent connecting rod when the handle and bracket are locked together with the projection only partially engaging the slot and the handle and bracket are rotated from their flat to their raised position, whereby the carrier is forced by cam action between the cam surface and the adjacent connecting rod toward full engagement between the projection and the slot.

* * * * *